United States Patent

[11] 3,590,663

[72] Inventors Hiroji Yamaguchi;
Noboru Murakami; Koichiro Hirozawa, all of Kariya-shi, Aichi-ken, Japan
[21] Appl. No. 828,895
[22] Filed May 29, 1969
[45] Patented July 6, 1971
[73] Assignee Aisin Seiki Company Limited
Kariya-shi, Aichi-ken, Japan
[32] Priority May 31, 1968
[33] Japan
[31] 43/37229

[54] HYDRAULIC PRESSURE CONTROL MEANS FOR AUTOMATIC FLUID SPEED CHANGE MECHANISM
3 Claims, 7 Drawing Figs.

[52] U.S. Cl. ................................................ 74/867, 74/752
[51] Int. Cl. .................................................. B60k 21/10, F16h 5/42

[50] Field of Search ........................................... 74/867, 868, 869, 763

[56] References Cited
UNITED STATES PATENTS

| | | | |
|---|---|---|---|
| 2,697,363 | 12/1954 | Sheppard ..................... | 74/868 |
| 2,740,304 | 4/1956 | Sheppard ..................... | 74/868 |
| 2,912,874 | 11/1959 | Quistgaard et al. ........... | 74/869 |
| 3,321,056 | 5/1967 | Winchell et al. .............. | 74/869 X |
| 3,425,300 | 2/1969 | Ohya et al. ................... | 74/763 |

Primary Examiner—Arthur T. McKeon
Attorney—Sughrue, Rothwell, Mion, Zinn & MacPeak ABSTRACT: An automatic control means in an automotive automatic speed change mechanism wherein a governor valve is so designed and arranged to generate a hydraulic governor pressure in relation to the revolutions per unit time of the driven shaft of said mechanism and in reversed relation to the throttle valve pressure which is delivered thereto from a throttle control valve.

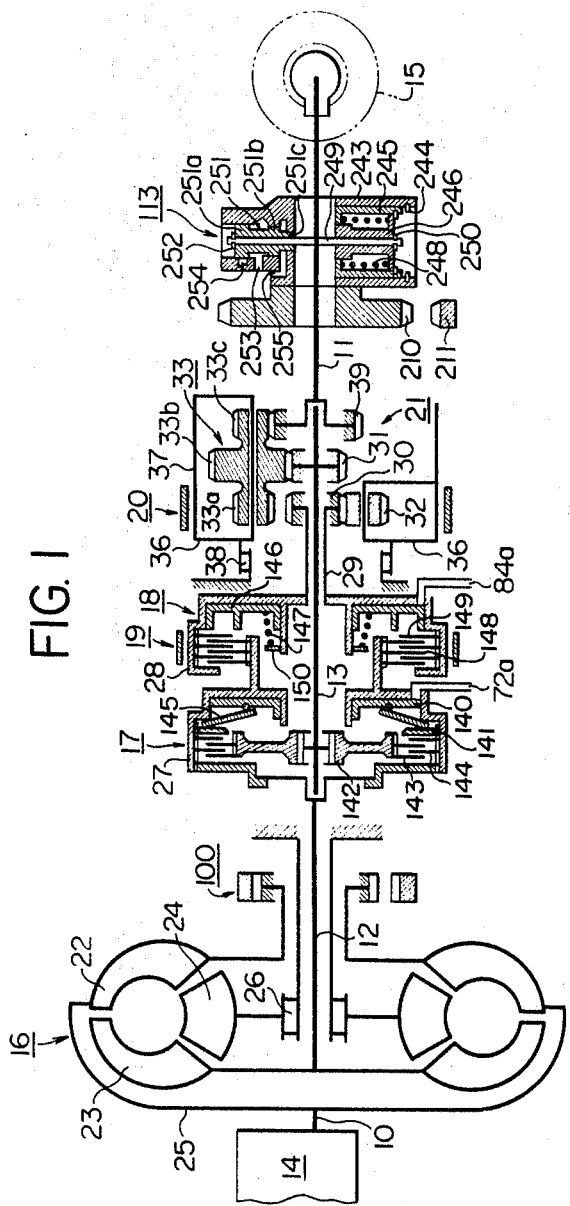
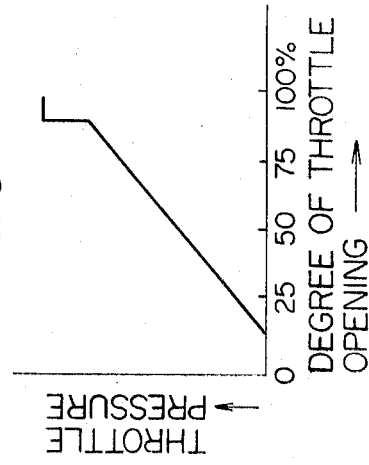

HYDRAULIC PRESSURE CONTROL MEANS FOR AUTOMATIC FLUID SPEED CHANGE MECHANISM

This invention relates to improvements in a relating to automatic fluid speed change mechanisms. It concerns especially with the hydraulic pressure control means for said speed change mechanisms. The fluid torque converter now broadly in use as the automotive automatic speed change means if fitted further with a mechanical speed change gearing so as to provide a plurality of forward speed change steps and a rear speed step, as is nowadays very commonly known. In addition, the planetary gearing is most predominantly employed as the mechanical speed change gearing used in the above sense from the reason that it is highly convenient for its easy manipulation, its compactness and the like superiorities over other type machines.

In these conventional combined speed change arrangement, wherein the mechanical gearing is controlled in its speed change operation by utilizing hydraulic pressure, one or a plurality of hydraulic clutches and one or a plurality of hydraulic brake means are selectively combined with each other and released and applied in a specifically selected manner. When, in this case, it is adopted to operate the mechanical speed change gearing in an automatic speed changing mode, shift valve means adapted for controlling the speed change is supplied, depending upon the amount of the torque under being transmitted, on the one hand, and upon the occasional vehicle speed, with the throttle pressure which varies with the degree of opening of the conventional engine throttle valve means, on the one hand, and the occasional governor pressure in proportion to the vehicle running speed, on the other hand, and indeed, in opposite relationship to each other. In effect, therefore, the differential between the both hydraulic pressures acts as the predominant measure for attaining the desirous speed change.

With such conventional automatic speed change arrangements, the shift valve means must be increased in its number of values with the increase of the number of speed change steps adopted, resulting in a highly complicated design of the hydraulic circuit for the realization of the desired purpose.

The main object is to provide a hydraulic control means which is capable of obviating the above mentioned conventional drawbacks.

In the control means embodying the principles of the invention, the throttle pressure in relation to the degree of opening of conventional engine throttle valve is applied in the same direction with the governor pressure in the above sense, for providing a governor pressure in reverse relationship with the degree of opening of the engine throttle valve means, yet in relation to the occasional vehicle speed, said governor pressure being conveyed to one or more of shift valve means.

In this way, a simple and efficient control mechanism adapted for the desired purpose may be provided so as to function depending upon the occasional degree of throttle opening as well as the occasional vehicle speed.

These and further objects, features and advantages of the invention will become more clear when read the following detailed description of the invention by way of a preferred embodiment shown schematically in the accompanying drawings which constitute a part of the present specification.

In the drawings

FIG. 1 is a schematic illustration, substantially sectional view of a representative arrangement of an automatic speed change which is designed and arranged to cooperate with the hydraulic control means of the present invention.

FIG. 2A and FIG. 2B constitute in combination a single drawing which shows schematically the hydraulic circuit employed in a preferred embodiment of the invention.

FIG. 3 is a chart wherein the throttle pressure has been plotted against the degree of opening of the engine throttle valve.

FIG. 4 is an explanatory chart showing the variation of governor pressure depending upon vehicle speed and engine throttle opening degree.

Figure 2A:
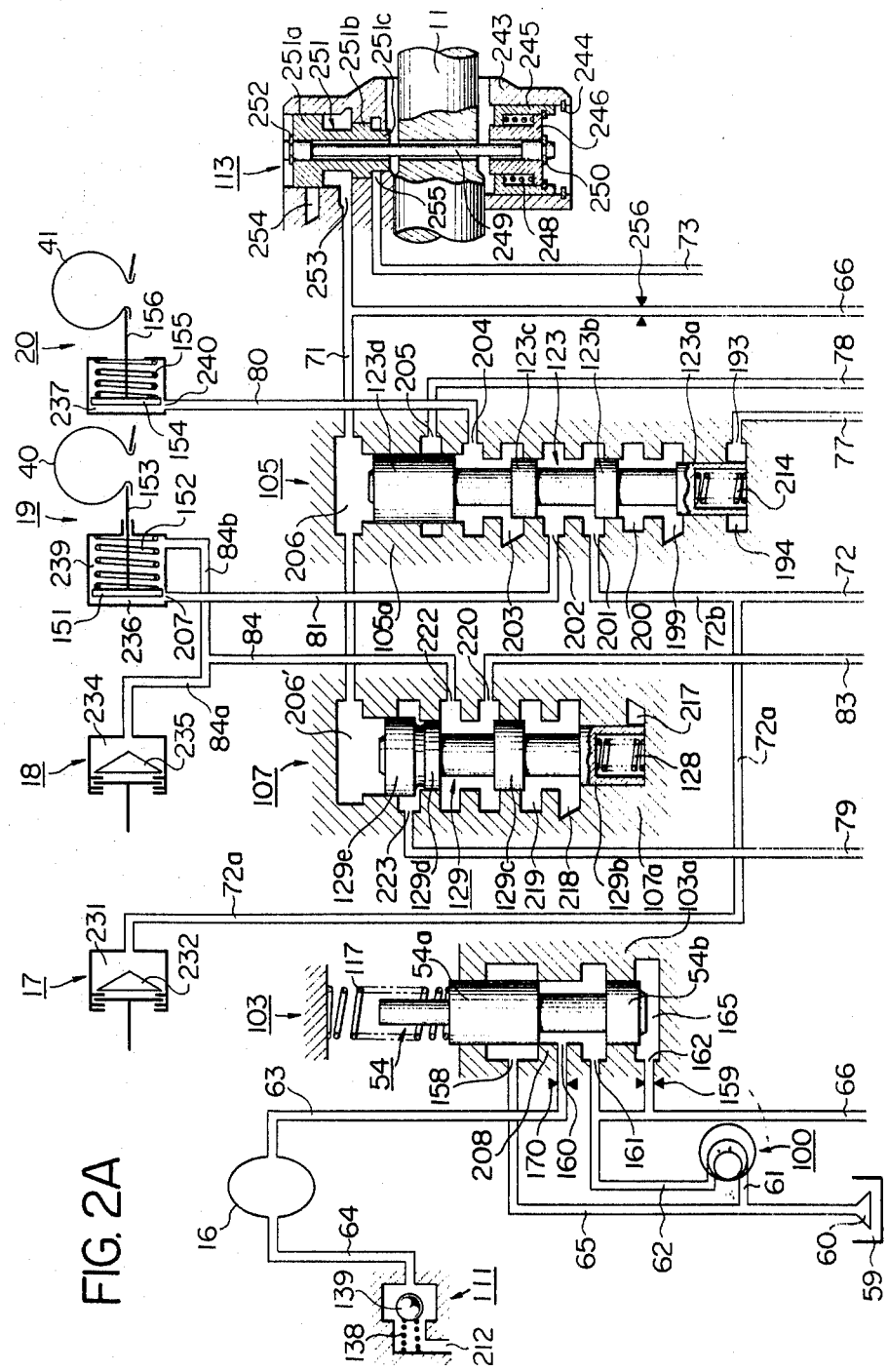

Now referring to the accompanying drawings, a preferred embodiment of the invention will be described hereinbelow in detail. It should be noted, however, that same reference numerals are used throughout several figures and this specification for representing same or similar parts so far as their respective functions are identical.

In FIG. 1 which shows only schematically an automatic speed change mechanism as employing a preferred embodiment of the hydraulic control means according to this invention, the numeral 10 denotes an input shaft and 11 represents an output shaft; and there are provided two intermediate shafts 12 and 13 between the input and the output shafts, all these shafts being arranged substantially in a line as shown. The input shaft 10 is constituted in practice by the crankshaft of an automotive internal combustion engine partially and schematically shown at 14. The output shaft 11 is mechanically connected through a conventional differential gearing and axle shaft, not shown, with automotive drive wheels, as conventionally constructed, although the latter are shown as only one at 15 for simplicity of the drawing. Intermediate shafts 12 and 13 are operatively connected with input shaft 10 and output shaft 11, respectively, through suitable mechanical means, although not specifically shown only for its popularity. The speed change mechanism shown comprises a fluid torque converter 16; hydraulically operated friction disc clutch means 17 and 18; hydraulically operated friction brake means 19 and 20; and a planetary gearing 21.

The hydraulic torque converter 16 comprises as conventionally constructed, a pump impeller 22; a turbine wheel 23 and a stator wheel 24. Pump impeller 22 is rigidly connected through a drive plate 25 with the engine crankshaft 10 and adapted for being driven therefrom. Turbine wheel 23 is mechanically coupled through a spline connection, not shown, with the first intermediate shaft 12. Stator wheel unit 24 is mechanically connected to an one way brake unit 26 which is shown only in a highly simplified manner. By the provision of said one way brake, the stator wheel 24 can rotate only in one direction which is same as that of the pump impeller 22. The second shaft 12 is rigidly coupled with the clutch drum at 27 of first clutch unit 17 for rotation in unison with each other, said clutch drum being formed with an extension acting as the inner hub of second clutch unit 18.

The inner hub at 142 of the first clutch unit 17 is splined with second intermediate shaft 13 mounting nearly at its rear end a sun gear 31 through spline connection and thus for unitary revolution with each other. On the other hand, the clutch drum at 28 of second clutch unit 18 is keyed to hollow sleeve 29 which mounts in turn a sun gear 30 through a spline coupling. Therefore, clutch drum 28, hollow sleeve 29 and sun gear 30 rotate together.

Planetary gear 33 comprises gear elements 33a, 33b and 33c rigidly united with each other, yet having different respective numbers of gear teeth and being rotatably mounted on a carrier 36. This carrier 36 is made integral with a brake drum 37 and mounts in turn rotatably a planetary gear 32 which meshes through sun gear 30 with planetary gear element 33a.

Clutch drum 37 is fitted with one way brake 38 and rotatable in the same rotational direction with the engine crankshaft 10.

Planetary gear element 33b meshes with sun gear 31 and similar gear element 33c does with sun gear 39 which is rigidly mounted on the output shaft 11 for rotation therewith.

Numerals 19 and 20 represent separate band brake units which are shown in a highly simplified way only for convenience, said units being arranged for bringing the respective clutch drums 28 and 37, and thus sun gear 30 and carrier 36, respectively, into their rest conditions.

Figure 2B:
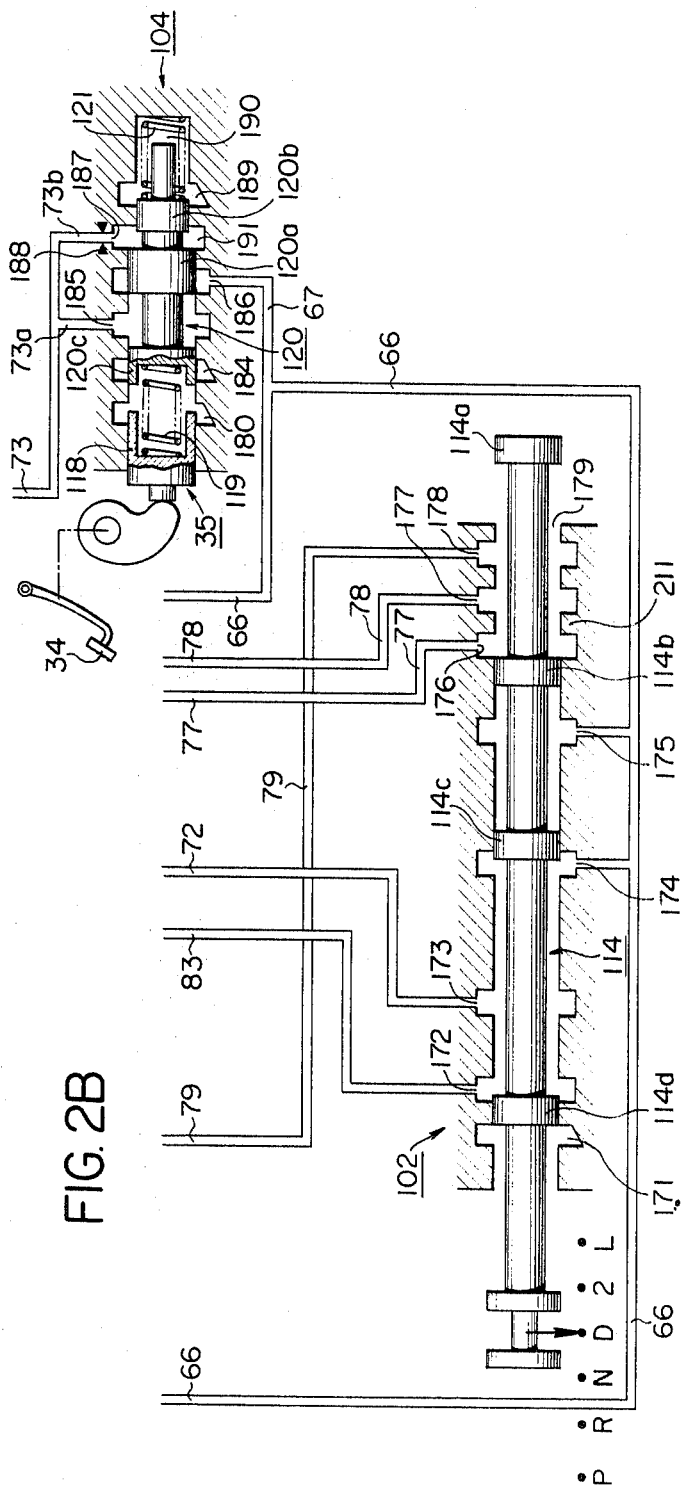

A manually controllable spool valve 102, shown in FIG. 2B, has six control positions, or more specifically P-, R-, N-, D-, 2- and L-positions.

When the spool valve 102 is placed in the N-position, the speed change mechanism is brought into its neutral position. When the valve is placed in the L-position, a low speed drive ratio is generally obtained. When the valve is manually shifted, however, from the high speed drive ratio to L-position, a middle speed drive ratio will be once realized and with the wheel speed reduced to a certain limit, then the low speed drive ratio will be attained finally.

With the valve 102 moved to its 2-position, either low speed drive ratio or middle speed drive ratio will be attained, depending upon the occasional wheel speed and the occasional opening degree of the conventional automotive throttle valve, not shown.

With the spool valve 102 adjusted to its D-position, there will be two different operational modes of the speed change mechanism may be invited. In this case, when the vehicle is started with low speed drive ratio, the ratio may be adjusted automatically to the middle speed or the high speed drive ratio, depending upon the occasional vehicle speed. Or conversely, when the vehicle speed drops, an automatic control of transmission among low speed, middle speed and high speed depending upon the occasional vehicle speed.

With the spool valve 102 moved to R-position, the reverse drive stage will be realized.

With the spool valve 102 moved to P-position by means of a selection lever, not shown, pawl 211 is brought into meshing with an outer gear 210 which is keyed to the output shaft 11 for fixing the latter against rotation.

As will be understood from the foregoing, the forward low speed drive ratio can be realized with the spool valve 102 adjusted to either one of L-, 2- and D-position. With the spool valve positioned at D-position, any other speed ratio can not be realized, so far as the selection lever is not operated to other position. The low speed ratio can be realized with the spool valve positioned at L-position by applying hydraulic pressure to pistons 232 and 154 so as to actuate clutch unit 17 and brake unit 20, respectively. The low speed drive ratio thus obtained are of two-way drive.

The low speed ratio is also realized with the spool valve adjusted to either 2- or D-position, by applying hydraulic pressure to piston 140 to actuate clutch 17. In this case, the former function performed by brake unit 20 is carried into effect by one-way brake 38. In this case, the low speed drive is made in the mode of one-way drive.

In this case, one-way brake 38 acts as a kind of safety means. Now it is assumed that the vehicle is started with the spool valve 102 positioned at L, and then the latter is shifted to 2- or D-position. Then, the second brake unit 20 already applied for providing the low speed drive ratio is disengaged, first brake unit 19 or second clutch unit 18 is disengaged, and thus either the middle or high-speed drive ratio will be provided. When there be a lag among these sequential operations, for instance, when second brake unit 20 is released in advance of the actuation of the first brake unit or the second clutch unit, the engine 14 will be subjected to a disadvantageous speed increase effect reversely through its crankshaft 10 and a sudden and severe shock would be invited at an succeeding engagement of the first brake or the second clutch. In order to overcome this difficulty, one-way brake 38 takes over the function of second brake 20 upon release thereof, and otherwise possible engine speed increase in the above sense is positively prevented until the engagement of first brake 19 or second clutch 18 will have been brought into effect. Thus, it will be clear that one-way brake 38 acts during the low speed drive stage to prevent any reverse rotation of carrier 36 relative to the regular rotational direction of the engine crankshaft 10, thereby taking over the function of second brake 20. Upon the engagement of first brake 19 or second clutch 18, carrier 36 will start to rotate in the same direction as the crankshaft 10 and one-way brake 38 will be disengaged automatically at a suitable time, thereby providing a smooth change over from low speed drive ratio to middle or high-speed drive ration.

With the low-speed drive ratio, rotation is transmitted from first intermediate shaft 12 through first clutch unit 17 to second intermediate shaft 13, thereby the sun gear 31 acting as the drive element of the gearing 21 being driven. Rotation is thus transmitted from the sun gear 31 to planetary gear elements 33b and 33c, thence to sun gear 39, thereby the output shaft 11 being driven at a reduced rate relative to second intermediate shaft 13. In this case, torque conversion will take place within the torque converter 16 and in the gearing 21 so that the resulted driving torque at the output shaft 11 depends upon the product of the both specific torque ratios at the converter and the gearing. The intermediate speed drive ratio is attained in such a way that first clutch unit 17 is engaged. With the intermediate speed drive ratio thus attained, the power transmission is brought about substantially in the same way as with the low speed drive ratio. In this case, however, sun gear 30 is kept stationary by the application of first brake 19, this sun gear will act as the reaction member in the gearing 21, in place of the carrier 36 in the foregoing stage. With the sun gear 31 rotating in this case in unison with both intermediate shafts 12 and 13, and with the sun gear rotatable permanently in unison with output shaft 11, the gear elements 33b and 33c of the combined planetary gear 33 mesh respectively, while the remaining planetary gear element 33a meshes with planetary gear 32 mounted on the carrier 36 and kept in meshing with sun gear 30, said carrier acting as such for said planetary gear 33. Since, at the present stage, the sun gear 30 is kept stationary by the application of first brake 19, the carrier 36 rotates in the forward rotational direction. In this way, the sun gear 39 and thus the output shaft 11 is driven at a certain reduced rate relative to the second intermediate shaft 13 which ratio is smaller than the low speed drive ratio.

The intermediate speed drive ratio is obtained in the following two ways: In the first instance, the spool valve 102 is adjusted to either 2- or D-position and the vehicle speed is selected within a certain range by manipulating the conventional throttle valve, not shown. In the instance, the spool valve is adjusted from the high-speed drive ratio to L-position. With the spool valve positioned at any one of L-, 2- and D-positions, the low-speed drive ratio will be realized when the vehicle speed drops beyond a certain predetermined value. With the spool valve positioned at 2- or D-position, the intermediate speed drive ratio will be realized when the vehicle speed increases beyond a certain value. On the contrary, when the spindle valve 102 is being kept at L-position, a speed change to either the middle or high-speed drive ratio can not be realized.

The high speed drive ratio can be realized by manipulating the spool valve 102 to D-position with the vehicle speed kept at a reasonably high value. In this case, first clutch 17 is engaged, first brake 19 or second brake 20 is released and second clutch 18 is engaged, the latter being actuated by applying hydraulic pressure upon its actuating piston 235, as will be described more in detail hereinafter.

With this high-speed drive ratio attained, first intermediate shaft 12 drives the sun gear 31 through the intermediary of first clutch unit 17, as in the similar way with the case of the low speed or the intermediate drive ratio attained. Second clutch 18 acts to connect first clutch drum 27 which is coupled with first intermediate shaft 12, through second clutch drum 28 to sun gear 30. In this way, both sun gears 30 and 31 are driven in unison with each other from first intermediate shaft 12 and the planetary gearing 21 is driven as a rigid unit, said first intermediate shaft and said output shaft being coupled directly in effect with each other.

With the high-speed drive ratio thus attained, the torque converter 16 may be said to act only as a kind of fluid coupling, thus practically a direct drive being established between input shaft 10 and output shaft 11.

The reverse drive stage can be established by bringing second clutch 18 into engagement along with second brake 20. In this case, power is transmitted from the input shaft 10 through torque converter 16, first intermediate shaft 12, second clutch 18, sun gear 30, planetary gear 32, gear elements 33a and 33c of combined gear 33, and sun gear 39, to the output shaft 11. By the application of second brake 20, planetary gear carrier 36 acts as the reaction member of the gearing 21. In this case, the reaction force of the carrier 36 is directed in the forward drive direction. Since there are two planetary gears 32 and 33 between the driving and driven sun gears 30 and 39, the sun gear 39 and the output shaft 11 are driven in the reverse drive direction with a certain reduction rate relative to the first intermediate shaft 12. Under these operating conditions, torque converter 16 functions generally in the torque increasing way, and thus the torque implied upon the output shaft is defined by the product between the torque increasing factor at converter 16 and that provided by the planetary gearing 21.

Under the neutral condition of the speed change mechanism as realized by moving the manually operatable valve 102 to N-position, clutches 17 and 18 and brakes 19 and 20 are all kept in their released position. For the application of first brake unit 19, hydraulic pressure is fed to working chamber 236 so as to actuate piston 151, thereby rod 153 being urged to move in its working direction for the application of brake band 40. There is a brake releasing chamber 239 in opposition to the hydraulic working chamber 236, said chamber 239 housing therein a return spring 152 which acts to return the piston 151 for releasing the brake 19 when hydraulic pressure is supplied to the releasing chamber 239 in opposition to that prevailing in the working chamber 236.

For the application of second brake 20, hydraulic pressure is supplied to working chamber 237 for actuating piston 154 which is then urged to move against the action of return spring 155 and in the direction for the application of brake band 41.

From the foregoing, the speed change mechanism in which the hydraulic control means embodying the principle according to this invention as will be described hereinafter is fitted can be understood in its general construction and operation.

The hydraulic control mechanism according to this invention comprises generally a pump means 100, said manually operatable valve 102, a hydraulic pressure regulating valve 103, a throttle adjuster valve 104, a 1-2 position selector valve 105, a 2-3 position selector valve 107, a speed adjuster valve 113. Pump means 100 is of a constant delivery type, preferably one having an impeller gear and an internal tooth gear meshing therewith. Pump means 100 is so designed and arranged that it sucks oil from reservoir 59 through a filter 60 and a suction piping 61, and delivers it under pressure to a discharge piping 62. As shown schematically in FIG. 1, pump means 100 is so arranged that it is driven from the input shaft 10 through pump impeller 22 of torque converter 16. From the discharge piping 62, a piping 66 branches off and is arranged to act as line pressure conduit for providing hydraulic pressure to several friction clutch units as well as brake units which have been described hereinbefore by reference to FIG. 1, as will become more clear as the description proceeds.

Regulating valve 103 shown in FIG. 2A acts to regulate the hydraulic pressure in the piping 66. This valve 103 is made into a spool valve having separated lands 54a and 54b and urged by a return spring 117 to move downwards in FIG. 2. The valve spool of the pressure regulator 103 is slidably housed in its valve casing 103a which is formed with several ports at 158, 160, 161 and 162. Ports 161 and 162 are hydraulically connected with the line pressure conduit 66, the latter port 162 being so through the intermediary of a reduced flow passage or orifice schematically shown at 159. Port 158 is hydraulically connected with a conduit 65 which is connected in turn to the suction piping 61 of pump means 100. Port 160 is formed with an orifice 170, only schematically shown, thence through a conduit 63 to the torque converter 16. By selecting the orifice 170 to a proper size, the hydraulic pressure supplied to the converter 16 can be determined at a proper one.

Governor-type valve 113 shown in FIGS. 1 and 2 develops a hydraulic pressure depending upon the occasional vehicle speed, which hydraulic pressure is utilized for automatically selecting suitable one of the various speed drive ratios of the speed change mechanism, as will be more specifically described hereinafter. This governor valve 113 comprises a casing 243 fixedly mounted on the output shaft 11, a valve member 251 which is slidably mounted within the interior space of said casing 243, an inner weight mass 246, an outer weight mass 245 and a tension spring 248 arranged between said weight masses 245 and 246. These weight masses and the valve member are arranged at both sides relative to the output shaft 11. These weight masses and the valve member 251 are limited in their outwardly movable ranges by the provision of a traversely extending rod 249 relative to the output shaft and substantially passing through the governor valve assembly 113, and stop means 250 and 252 which are fixedly, yet detachably mounted at the both extremities of said rod 249. The valve member 251 is formed with three lands 251a, 251b and 251c which have different pressure-receiving areas from each other. The governor valve casing 243 is formed with ports 253, 254 and 255 of which the second port 254 is hydraulically connected to oil reservoir 59, although the piping serving for this purpose has been omitted from the drawing for simplicity. Port 253 is connected through a piping 71 to the line pressure conduit 66 which is formed therein with an orifice at 256 shown only schematically. Port 255 is connected to a piping 73 and its respective branch pipings 73a and 73b with ports 185 and 187 of the throttle valve assembly 104 for introducing reduced hydraulic pressure delivered therefrom.

Throttle valve 104 appearing in FIG. 2B in the form of a spool valve is designed and arranged to provide a variable hydraulic pressure in response to occasional position of a conventional automotive accelerator pedal 34, for the adjustment of the shift point of the speed change mechanism, and for the control of the hydraulic pressure to be supplied to various clutch units and brake units which have been already described by reference to FIG. 1. The throttle valve 104 is controlled through a downshift valve 35 which comprises a valve member 118 and a port 180, the latter acting as a discharge one. Valve member 118 is arranged to be operated by means of a suitable mechanical link mechanism, not shown, from the accelerator pedal 34 in such a way that with the accelerator is moved in the throttle opening direction, the valve member 118 is moved rightwards in FIG. 2B. As commonly known and thus not shown specifically, the accelerator pedal is mechanically connected through a suitable linkage, not shown, with the carburetor for the vehicle drive engine 14.

The throttle valve 104 comprises a spool valve member 120 provided with lands 120a, 120b and 120c, on the one hand, and several ports such as at 184, 185, 186, 187 and 189. A spring 119 is inserted under compression between said two valve members 118 and 120. A further spring 121 is provided at the right-hand side of valve member 120 in opposition to said spring 119. Ports 184 and 189 serve for discharge service, while port 186 is connected through a conduit 67 to the line pressure piping 66. Port 187 is formed with an orifice 188, only schematically shown, and connected through conduits 73a and 73b with port 185. Conduits 73a and 73b are connected hydraulically with piping 73 which is connected in turn hydraulically with port 255 of said governor valve 113.

2-3 shift valve 107 is provided with a spool valve member 129 and a spring 128 for urging resiliently the latter in the upward direction in FIG. 2A and formed with a smallest land 129b, two smaller lands 129c and 129d and a largest land 129e. The valve 107 is further provided with ports 217, 218, 220, 222 and 223 and two chambers 206 and 219. Although the connecting means are not shown for simplicity, ports 217 and 218 serve for conducting hydraulic liquid from the valve to oil reservoir 59. Chamber 219 serves no other purpose than the better and easier cutting of the valve bore. Port 220 is connected through a conduit 83 to port 172 of the manual shift valve 102. Port 222 is connected through conduit 84 and branch piping 84a to the working chamber 234 of second clutch unit 18, on the one hand, and through branch piping 84b to the releasing chamber 239 of first brake unit 19, on the other hand. Port 223 is connected through conduit 79 to port 178 of manual shift valve 102.

1-2 shift valve 105 serves for control the vehicle speed between the first speed stage and the second speed stage and operates in such a way that when the first brake unit 19 is actuated, the second brake unit 20 is released, and vice versa. The valve 105 has a valve member 123 which is formed with smallest land 123a, two middle sized lands 123b and 123c and largest land 123d. In order to urge resiliently the valve member 123 upwards in FIG. 2A, there is provided a spring 214 between the smallest land 123a and the stationary valve casing at 105a. The valve 105 is formed with ports 193, 199, 201, 202, 203, 204 and 205, and with chambers 194, 200 and 206. Ports 199 and 203 are hydraulically connected with oil reservoir 59, although the connecting means are not shown for simplicity, and serve for discharging oil from the valve. Port 193 is connected through conduit 77 to port 176 of the valve 102. Port 205 leads through conduit 78 to port 177 of the valve 102. Chamber 200 has no other purpose than more convenient and easy mechanical working of the valve bore.

Port 201 is connected through conduits 72b and 72 to port 173 of the valve 102. Conduit 72 is connected hydraulically with conduit 72a which is connected in turn hydraulically with the actuating chamber at 231 of first clutch unit 17. Port 202 is connected through conduit 81 to port 207 of the actuating chamber 236 of the first brake unit. Port 204 is connected through conduit 80 to port 240 of the actuating chamber 237 of second brake unit 20.

The operation of the hydraulic adjusting valve arrangement is as follows:

The oil pressure regulating valve 103 serves for the regulation of the hydraulic line pressure to a predetermined maximum pressure prevailing in the piping 66 and various piping means which are kept in communication therewith, for every working condition of the speed change mechanism, as well as the hydraulic pressure regulator mechanism.

When the valve 103 operates to regulate the pressure of the discharged hydraulic fluid from pump means 100, the lower surface of land 54a a valve member 54 cooperates to a larger or lesser degree with the upper surface of the ring wall 208 in the valve casing 103a, for performing the pressure regulating service. A reduced hydraulic pressure relative to the line pressure upon flowing from port 160 through the orifice 170 is conveyed further through conduit 63 to the torque converter 16. A conduit 64 connects the converter 16 with a check valve 111 the outlet of which leads through port 212 to a lubricating circuit, not shown. Check valve 111 serves for keeping the hydraulic pressure prevailing within the torque converter substantially at a predetermined constant value. A spring 138 is provided for resiliently urging the ball at 139 of the check valve 111 in the valve closing direction so as to cut off the port 212.

Governor valve 113 delivers the hydraulic governor pressure which is variable and applied to the valve member 251, said variable governor pressure being a function of the rotational speed of output shaft 11 which affects the relative position of the inner and outer weight masses and the tension of the spring 248 provided therebetween. With every operational mode of the mechanism, the hydraulic pressure delivered from pumping means 100 is conveyed through orifice 256 and conduits 66 and 71 to the port 253 of governor valve 113. The valve casing 243 of the governor 113 rotates with the output shaft 11 and with lower vehicle speed a certain hydraulic pressure, which is determined by the difference between the centrifugal forces acting upon the inner weight mass 246, on the one hand, and the outer weight mass 245 and the valve member 251, on the other hand, and by the throttle pressure as applied upon the differential area between lands 251b and 251c of the valve member 251, will be applied upon the differential area between both valve lands 251a and 251b. This hydraulic pressure will increase, with speed increase at the vehicle drive wheels 15.

With higher vehicle speed, the outer weight mass 245 will shift outwards under the action of the increased centrifugal force and finally be brought into abutting engagement with the snap ring 244 acting as a stop. Under these operating conditions, the hydraulic pressure applied upon the valve member 251 will be counterbalanced by the centrifugal force acting upon the inner weight mass 246, the spring force at 248 which has been increased by virtue of said outward displacement of the outer weight mass 245 and finally the aforementioned throttle pressure. Under these conditions, the centrifugal force induced in both weight masses will vary in a two-step course and relative to the vehicle speed as well as the throttle pressure, as will be easily seen from FIG. 4. Actuation of the accelerator pedal 34 will be transmitted through the valve member 118 of the valve 35 upon the valve member 120, thus bringing the throttle pressure to be conveyed to conduit 73. This hydraulic pressure is generally lower than the line pressure, and will vary from nearly zero value which is attained by closure of said throttle, to that as high as the line pressure which is realized upon opening of said throttle. The line pressure will be applied from the conduit 67 into the throttle valve 104, a variable hydraulic pressure shown in FIG. 3 appearing at both sides of the valve land 120a, the right-hand side chamber only being denoted by the numeral 191. This variable hydraulic pressure is conveyed through port 185 to the throttle pressure conduit 73, thence to port 255 of governor valve 113.

The overall operation modes of the speed change mechanism are as follows:

NEUTRAL RANGE

When the vehicle driver manipulates a selector lever, not shown, which is mounted in the neighborhood of the driver's seat, so as to bring the manual shift valve 102 to its N-position which is the neutral position, the hydraulic line pressure supplied from conduit 66 through ports 174 and 175 will be checked by valve lands 114b and 114c, thus no hydraulic pressure being transmitted to other valve means and several hydraulically actuating piston means for friction clutches and brakes, and thus the speed change mechanism is kept at its neutral piston.

L-RANGE

When the selection lever is manipulated to adjust the manual shift lever 102 to L-position, the line pressure prevailing in the conduit 66 will be conveyed through the port 175 situated between valve lands 114b and 114c in the drawing, to valve ports 176 and 177. The line pressure is then conveyed through port 174 and the valve space between the lands 114c and 114d to port 173. The hydraulic pressure is conveyed from port 177 through conduit 78 to port 205. On the other hand, the line pressure will be conveyed through conduit 77 and port 193 to the chamber 194. The combined pressure appearing at this stage in the chamber 194 by the hydraulic pressure and the spring 214 will act upon the valve 123 upwards in the drawing to L-position where the latter is kept fixed at the low speed position. By this shift movement of valve 123, port 205 is brought into communication with port 204, the hydraulic line pressure being thus conveyed through conduit 80 to the actuating chamber 237 of second brake unit 20. At the same time, line pressure will conveyed from port 173 through conduits 72 and 72a to the actuating chamber 231 of first clutch unit 17. On the other hand, line pressure conveyed through conduits 72 and 72a to port 201 is interrupted by the valve lands 123a and 123b, thus the pressure being confined within a chamber shown at 200. Line pressure will emerge from the conduit 67 through port 186 at the throttle valve 104, appearing at the right-hand chamber 191 of valve land 120a, at the left-hand chamber thereof. Then, the hydraulic pressure is conveyed from port 185 to the throttle pressure conduit 73, thence to port 255 of the governor valve 113.

In this way, the first clutch unit 17 and the second brake unit 20 are brought into actuation, thus the planetary gear carrier 36 being brought into its stationary position. Therefore, the speed change mechanism is adjusted to its first speed stage providing the low-speed drive ratio. One-way brake 38 checks at this stage the carrier 36 in its one running direction which corresponds to the direction of the reaction force induced in the carrier 36 at the stage of first speed drive, yet allowing it to be free to rotate in the opposite direction. Thus, the carrier 36 is allowed to rotate in one direction, yet being fixed by second brake unit 20, it is capable of receiving in effect two directional drive. This is necessary to obtain the desirous engine-braking effect in the L-range.

By virtue of the hydraulic pressure acting upon the differential pressure receiving area between lands 123c and 123d of the 1—2 position shaft valve 105, the hydraulic pressure prevailing in the valve chamber 194 and that acting upon the differential area between lands 123a and 123b, the valve 123 is urged to move upwards in the drawing or towards the low speed selecting position and kept in this position, in spite of the value of the governor pressure prevailing in the valve chamber 206.

In this case, therefore, the speed change mechanism is kept in the first speed or the low speed drive stage, unless the selector lever will have been so manipulated that the shift valve 102 is moved form the now occupying L-position.

2-RANGE

When the shift valve 102 is moved to 2-position by manipulating the selector lever, the valve land 114b is brought to a position where it cooperates with the inwardly projecting ring wall projection 211 situated between ports 176 and 177, thus the hitherto established hydraulic communication between ports 175 and 177 being thereby interrupted. Other hydraulic circuit conditions are same as those of the foregoing L-range operation. In effect, the presently established hydraulic circuit conditions are such that the hydraulic line pressure has been released from the conduit 78 and others are same as before. By virtue of the failure of line pressure in the said conduit 78, the hitherto acted hydraulic pressure upon the differential area between valve lands 123c and 123d becomes void and the valve will be shifted downwards or to the vehicle high-speed drive position, should the vehicle speed be increased and the governor pressure prevailing in the valve chamber 206 increases. In this case, the line pressure in the port 201, having been interrupted by valve lands 123a and 123b, will be conveyed from between lands 123b and 123c to port 202, thence through conduit 81 to the actuating chamber 236 of first brake unit 19. In this way, it will be clear that at lower vehicle speed, the line pressure is applied only to first clutch unit 17, other clutch and brake means being free from application of the line pressure. By virtue of one-way brake 38 brought into actuation, the low speed drive stage is realized. When the vehicle speed increases and the 1-2 position shift valve 105 is shifted to the high speed side, the line pressure is supplied to the respective actuating chambers 231 and 236 of first clutch 17 and first brake 19, the second or intermediate speed drive stage will be realized. When the accelerator pedal 34 is suddenly depressed when the vehicle is running with the second speed drive stage, the governor pressure will be suddenly decreased by virtue of an abrupt increase of the throttle valve pressure within the port 255 of governor valve 113, thereby the combined pressure of line pressure prevailing in valve chamber 194 with spring force at 248 overcoming the governor pressure. In this way, the valve 123 is moved upwards or to its low speed stage position, the hitherto established hydraulic communication between ports 201 and 202 being interrupted by valve land 123b. Now, a hydraulic communication between ports 202 and 203 is established by the valve space defined by valve lands 123b and 123c. Thus, the application of first brake 19 is released, while the one-way brake 38 is brought into actuation, thereby establishing the first speed or low-speed drive stage being brought into realization. With the vehicle speed increased under these operating conditions, the governor pressure in valve chamber 206' will increase beyond the hydraulic pressure urging the valve towards the low-speed drive position. Then, the valve 123 will be shifted towards the high-speed drive position, thus the second speed or the intermediate speed operation being brought about. In this way, with the shift valve 102 kept at 2-position, automatic speed change operation will be performed between the first and second speed drive mode.

D-RANGE

When the shift valve 102 is adjusted to D-position by manipulating the selection lever, the line pressure prevailing in conduit 66 is conveyed through port 174, valve space defined between valve lands 114c and 114d and port 172 to conduit 83, while port 176 hitherto kept in fluid communication with port 175 is interrupted by valve land 113b, and port 176 is brought into communication with discharge port 179. Thus, oil pressure is discharged from chamber 194 of the 1-2 position shift valve 105. With the exception of this, the line pressure is conveyed to same conduits as before where the shift valve 102 is kept at the 2-position.

Line pressure is conveyed from conduit 83 to port 220 of the 2-3 position shift valve 107. With lower vehicle speed and with the governor pressure being low correspondingly, valve 129 is kept at its upper position in the drawing under the action of spring 128, thus being kept at the low-speed drive position. The hydraulic line pressure is interrupted at between the valve lands 129b and 129C. When the vehicle speed increases under these operating conditions and thus the governor pressure in valve chamber 206' increases correspondingly beyond a predetermined value, it becomes to overcome the spring pressure at 128, acting the valve to urge upwards in the drawing, thus the valve 129 being downwards or towards the high-speed drive position. Therefore, line pressure is conveyed from conduit 83 through the port 220, the valve space defined between valve lands 129c and 129d, the port 222, the conduit 84 and branch conduits 84a and 84b, to actuating chamber 234 of second clutch 18 and to releasing chamber 239 of first brake 19, respectively. In this way, the clutch 18 is engaged, while the brake 19 is released. By bringing first clutch 17 and second clutch 18 into actuation, the third or high-speed drive stage can be realized.

When the vehicle is started with the D-position selected out, the speed change will be performed from the first to the second, thence to the third speed stage in progression, with corresponding increase of the governor pressure in response to the increasing vehicle speed and to the increasingly opening operation of the throttle. Or conversely, when the vehicle speed decreases from its highest value, the governor pressure will decrease correspondingly and the speed change operation is carried into effect from the third to the second, and thence to the first speed stage in succession.

Figure 5:
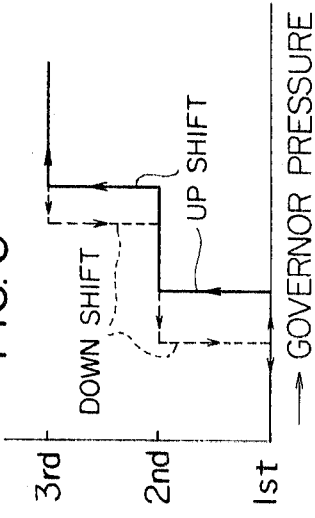
FIG. 5 is a further explanatory chart showing the relationship between the governor pressure and the speed change stage.
Figure 6:
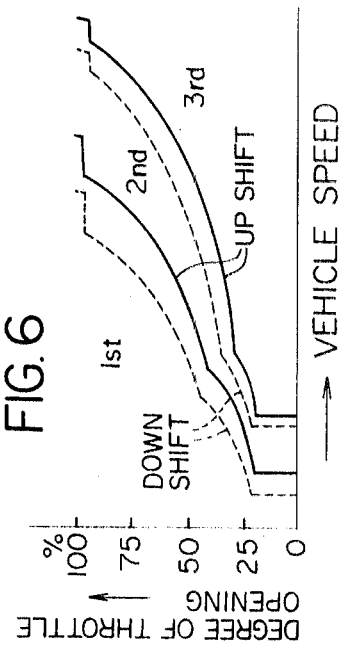
FIG. 6 is a still further explanatory chart showing the relationship between the engine throttle opening degree and the vehicle speed.

These speed change modes can be easily understood by reference to FIGS. 5 and 6.

When it is assumed that the vehicle is running with the second speed stage with the shift valve positioned at D-position and the occasional vehicle speed is less than a certain predetermined value such as 40 km/hr, the throttle valve pressure will increase in an abrupt manner upon sudden depression of accelerator pedal 34 and the governor pressure at 113 will decrease correspondingly abruptly. Thus, under the influence of spring pressure at 214, the valve 123 will shift upwards in the drawing, or towards the low-speed position, thereby the hitherto established communication between conduits 72b and 81 being interrupted and the line pressure serving for keeping the first brake 19 in its applied position being released through discharge port 203 of valve 105.

In this way, first clutch 17 only is kept in engagement and other engageable means are kept in ineffective, and in addition to the first clutch, one-way brake 38 is engaged. In this way, the first or the low-speed drive stage is brought about.

When further assuming that the vehicle is running at a certain speed below a predetermined value such as 80 km/hr and with Dd position having been selected out, and that the accelerator pedal 34 is depressed suddenly under these conditions, the governor pressure at 113 is regulated depending upon the throttle pressure which depends in turn upon the degree of depression of accelerator pedal. Then, the valve 129 is shifted to the low-speed position under the spring action at 128, for realizing the second speed change mode. Or alternatively, when the throttle valve pressure is still higher, while the vehicle speed is comparatively low, the 2–3 position shift valve 107 is shifted to the low speed position as before. At the 1–2 position shift valve 105, the spring pressure at 214 overcomes the governor pressure force in the valve chamber 206 and the valve 123 is shifted to the low-speed position, thereby the first speed mode being brought about. In this way, rapid down-shift operation either to the second or the first speed mode can be realized, depending upon the more or lesser degree of depression of the accelerator pedal, on the one hand, and the vehicle running speed occasionally being realized, on the other hand.

MANUAL DOWN SHIFT

With the speed change mechanism so far shown and described, a manual down shift from the high-speed drive ratio may be attained with the selector lever set to D-position, to either the intermediate drive ratio or the low speed drive ratio, by adjusting said lever to 2- or L-position, respectively. In addition, a manual down shift from the intermediate speed drive ratio with the selector lever set to 2-position, to the low speed drive ratio by shifting the lever to L-position.

When it is desired to make a manual down shift either from D-position or 2-position to L-position, specifically selected from the various manual shift possibilities above mentioned, and when the low-speed drive ratio is desired to realize in spite of occasional faster running speed of the vehicle, the desired operation will be checked from its practical realization when an excessively high running speed of the engine is not effectively prevented, because the speed change mechanism will act to prevent the shift to the low-speed drive ratio.

The above specific kind of down shift operation is checked in the following way:

When the selector lever set to D-position or 2-position to provide the high or intermediate drive ratio, respectively, is manually shifted down to L-position so as to invite an engine braking condition during vehicle running, the governor pressure will generally become higher than otherwise normal value, because of that in this case the accelerator pedal has been returned to such position as closing the throttle and thus the throttle valve pressure becomes nearly zero value, thus the latter pressure providing substantially no effect upon the operation of adjusting valve 113. With the vehicle speed over a certain predetermined value, the valve-urging governor pressure at 1–2 shift value 105 will overcome the spring pressure 214 and a down shift operation can not be realized. In this case, the shift valve is kept at 2-position. Only when the vehicle speed has dropped beyond a certain value, the valve 123 will be moved upwards in FIG. 2A to the position destined for the low speed, thus the desired low speed drive ratio being realized.

REAR DRIVE

By manipulating the selector lever so as to shift the manual shift valve 102 to R-position which means that for rear drive, line pressure will be conveyed to ports 176, 177 and 178. The line pressure conveyed from port 176 the chamber 194 of 1–2 position shift valve 105 acts in cooperation with that which is conveyed from port 177 to port 205 of the valve 105 upon the valve member 123 for fixingly positioning it at the position destined for the low-speed drive stage. Under these operative conditions, line pressure will be conveyed from said port 177 through ports 205 and 204 of valve 105 to the actuating chamber 240 of second brake unit 20, thus the latter being brought into engagement. On the other hand, the line pressure conveyed from port 178 through conduit 79; port 223 of 2–3 position shift valve; the valve space defined between lands 129c and 129d of valve 129; port 222 and conduits 84, 84a and 84b, to the actuating chamber 234 of second clutch 18, on the one hand, and to the release chamber 239 of first brake unit 19, on the other hand. Thus, the clutch 18 is brought into engagement, while the brake 19 is released. At this stage, the actuating chamber 231 of first clutch 17 is kept in fluid communication through conduits 72a and 72; and port 173 of manual shift valve 102, to discharge port 171. Therefore, the first clutch unit is kept in its released position.

By bringing the second clutch and the second brake into engagement in the above-mentioned way, the rear drive stage is brought about as desired.

Although, in the foregoing embodiment, the valve 35 is arranged to be controlled from the foot operated accelerator pedal 34, a slight modification therefrom can be brought about so as to control the valve 35 depending upon the vacuum pressure prevailing in the engine suction manifold, not shown. With this modified arrangement, similar effect as mentioned in the foregoing can be attained. For this purpose, a spring-loaded piston cylinder assembly of known construction for providing a variable mechanical effort depending upon the degree of vacuum pressure prevailing in the engine suction manifold, is preferably provided and the piston is mechanically connected through a mechanical linkage with said valve 35, although not shown only for simplicity.

From the foregoing, it will be clear that the variable speed mechanism according to this invention provides a highly simplified hydraulic circuit arrangement in comparison with a comparable conventional one wherein the governor pressure and the throttle pressure are applied to the shift valve means in the opposite sense to each other and the differential hydraulic pressure is utilized for performing the speed change operation, because in the former case the conventional hydraulic control circuit employs a hydraulic circuit between the throttle valve and one or more of the shift valves. In addition, with the present invention it is not absolutely necessary to mount said throttle valve in proximity to the shift valve means which fact further contributes in the simplification of the necessary hydraulic circuit arrangement. The design, manufacture and arrangement of the valve bodies can also be simplified and made easier than the conventional hydraulic control devices

We claim:

1. An automatic control means for a vehicle automatic speed change mechanism, said automatic speed change mechanism including a driving shaft, a driven shaft, a multistage speed change gearing mechanism drivingly connected between said drive and driven shafts, a plurality of hydraulically actuated frictionally engageable means operatively connected to said speed change gearing mechanism for providing a plurality of speed change ratios between said drive and driven shafts upon the application of hydraulic pressure thereto, said hydraulically actuated frictionally engageable means providing a selected one of said plurality of speed change ratios, said automatic control means comprising, a hydraulic pressure source, hydraulic conduit means for communicating the output of said hydraulic pressure source with said hydraulically actuated frictionally engageable means, hydraulic pressure regulating means in communication with said hydraulic conduit means for regulating the line pressure supplied by said hydraulic pressure source, shift valve means hydraulically connected in said conduit means for selectively controlling the distribution of hydraulic line pressure to said hydraulically actuated frictionally engageable means, a throttle control valve communicating with the output of said hydraulic pressure source for generating a hydraulic pressure in response to an engine throttle position and load condition, a hydraulic governor valve for generating a hydraulic pressure which varies as a function of the speed of said driven shaft, a first hydraulic pressure conduit communicating the output of said throttle valve with the input of said governor valve, a second hydraulic conduit communicating the output of said hydraulic pressure source with the output of said governor valve, said output of said governor valve being further communicated with said shift valve means for automatically controlling the operation of said shift valve means depending on the speed of said driven shaft, the output of said governor valve being caused to decrease with an increase in the output pressure of said throttle valve, whereby the shift valve means is caused to down-shift to a lower speed change gear ratio due to the rapid decrease in the governor valve output pressure.

2. An automatic control means as claimed in claim 1, wherein said second hydraulic conduit is connected between the line pressure input to said throttle valve and the output of said governor valve, and further including an orifice restriction located in said second conduit, whereby a pressure drop is created between the input to said throttle valve and the output of said governor valve.

3. An automatic control means as claimed in claim 1, wherein said governor valve means comprises a centrifugally actuated valve means operatively connected to said driven shaft, said output pressure of said throttle valve acting on said governor valve in opposition to the centrifugal force thereon, whereby, when said throttle valve is actuated, hydraulic pressure will be supplied to said governor valve in opposition to the centrifugal force thereon to cause the output pressure of said governor valve to be rapidly decreased to down-shift said shift valve means to a lower speed change gear ratio.